Oct. 27, 1931.   F. F. PARKER   1,828,981
AEROPLANE
Filed Dec. 2, 1929   2 Sheets-Sheet 2
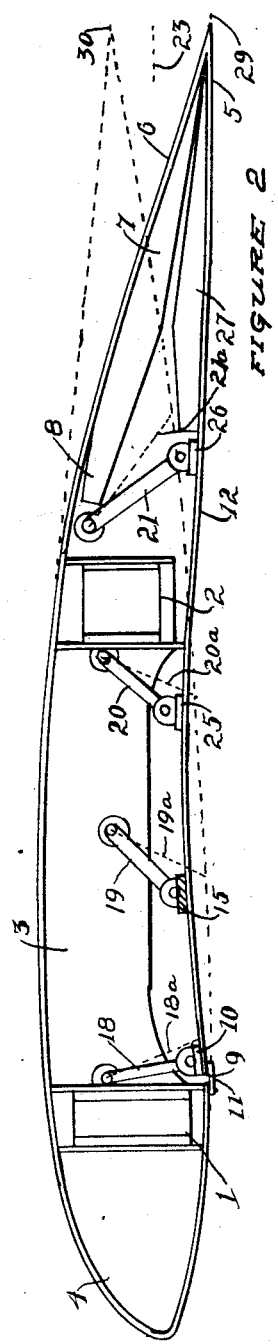
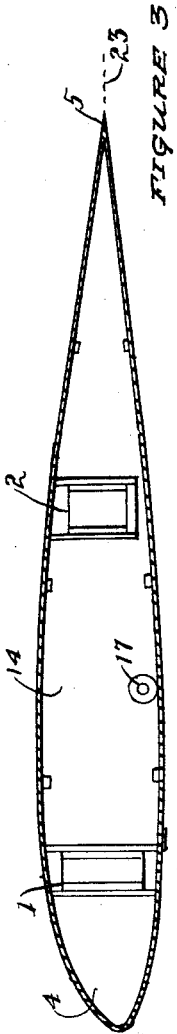
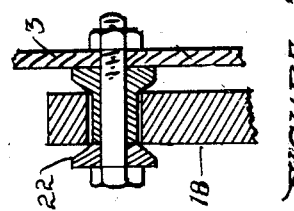
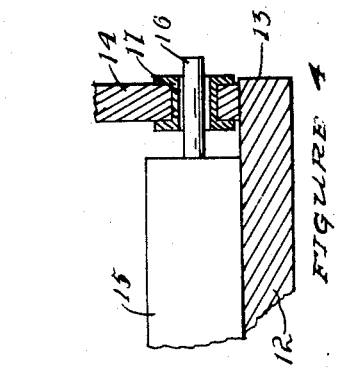
INVENTOR
Francis F. Parker
John A. Naismith
ATTORNEY Patented Oct. 27, 1931

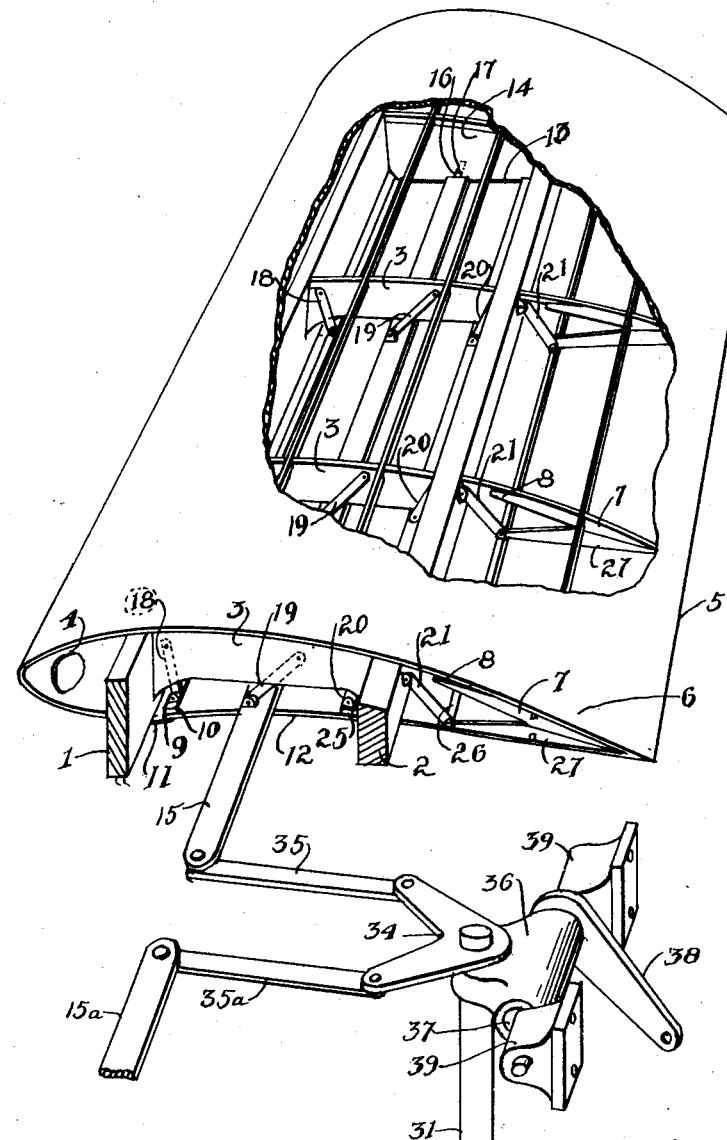

1,828,981

UNITED STATES PATENT OFFICE

FRANCIS F. PARKER, OF LOS GATOS, CALIFORNIA, ASSIGNOR OF ONE-HALF TO ROBERT G. FOWLER, OF SAN JOSE, CALIFORNIA

AEROPLANE

Application filed December 2, 1929. Serial No. 411,032.

This invention relates particularly to an aeroplane airfoil.

It is one object of the invention to provide an airfoil that may be rigidly mounted upon the fuselage of an aeroplane and with sufficient strength and rigidity to carry all major stresses, and yet be capable of having the contours of its upper and lower surfaces changed by the pilot as he may deem necessary to meet varying conditions.

It is another object of the invention to provide a means for varying the contours of an airfoil at the will of the pilot whereby to extend or increase the speed range of an aeroplane, increase the angle of climb, secure a lower landing speed without sacrifice of longitudinal or lateral stability, increase the lift or decrease the drag of the airfoil.

It is also an object of the invention to provide a means of varying the cambre and angle of the wing progressively from the condition of maximum lift to that of minimum drag in such a manner as to result in a decreasing angle from root to tip, in all positions except that of minimum drag.

It is still a further object of the invention to provide an airfoil of the character indicated that will be economical to manufacture, simple in construction, of few parts, easily and accurately manipulated from the cockpit of the aeroplane, strong, durable and highly efficient in its practical application.

In the drawings:

Figure 1 is a perspective illustration of an airfoil embodying my invention, part broken away, and showing the operating means connected thereto.

Figure 2 is a vertical transverse cross-section through an airfoil embodying my invention showing extreme positions of the trailing edge.

Figure 3 is a section on line 3—3 of Figure 1.

Figure 4 is an enlarged detail section of the pivotal mounting of the control spar.

Figure 5 is a detail section of one end of one of the links actuated by the control spar and showing its connection to the rigid framework of the airfoil.

In the embodiment of the invention herein shown I show at 1 and 2 the main airfoil spars which are rigidly built into the aeroplane fuselage in the usual manner, and rigidly spaced by webs 3. The contour of the leading edge of the airfoil is determined by webs as 4. The airfoil covering may be of any suitable material and begins along the lower edge of the forward spar 1 to which it is rigidly attached, and overlies the webs 3 and 4 and the upper edges of spars 1 and 2 and providing, thus far an unyielding contour.

From the rear spar 2 the covering extends rearwardly to the trailing edge 5, this portion of the upper covering being indicated by the reference 6. Portion 6 is strengthened by spaced ribs as 7 secured to its under side and within the airfoil, their forward ends as 8 being free whereby to permit an upward swinging movement of part 6 and yet form a support therefor when swung downwardly.

From the trailing edge 5 the lower covering of the airfoil extends forwardly to a point 9 adjacent the spar 1, this forward edge having a longitudinal rib 10 mounted thereon. A cover strip 11 is mounted on the lower rear edge of spar 1 to overlap the forward edge 9 of this bottom cover portion 12. This bottom portion 12 is left unattached to the main structure of the airfoil at its outer edge 13, merely having a sliding engagement therewith as clearly shown in Figure 4, reference 14 indicating the end closure of the airfoil.

Mounted upon the portion 12 as an integral part thereof is a control spar 15 having a pin 16 set in its outer end loosely engaging a bearing 17 in end 14, this support for the bearing being of such a nature as to permit the spar to be swung backwardly and forwardly at its inner end, and at the same time to permit a sliding movement of the spar relative to the end 14.

In the present instance I show four parallel rows of links as 18, 19, 20 and 21 connecting the fixed framework of the airfoil and the portion 12, each link having its ends connected as shown in Figure 5 through the medium of a bevelled bushing 22 whereby a limited lateral rocking movement of the link relative to its mounting is permitted.

Considering the trailing edge 5 to be in the position of minimum drag as indicated in dotted lines at 23, the several rows of links are arranged as follows. The first or forward row 18 are connected to the rib 10 of portion 12 and lie in an upwardly and forwardly inclined angle to their points of connection to spar 1. Links 19 and 20 are mounted on longitudinal ribs 15 and 25 on portion 12 and lie in upwardly and rearwardly inclined angles to their points of connection to webs 3, the inclination of links 19 being somewhat more than that of links 20. Links 21 are attached to longitudinal rib 26 on portion 12 and incline upwardly and forwardly therefrom to their points of connection to spar 2, their degree of inclination being greater than that of links 18. The rear trailing portion of part 12 is strengthened and supported by spaced ribs 27.

It may now be readily seen that by means of the construction hereinbefore set forth by a forward swinging movement of control spar 15 the links 18, 19, 20, 21 will all be swung in the direction indicated by arrows 28 with the result that the airfoil portion 12 is caused to assume the position shown in solid lines in Figure 2, its outer end remaining in its normal position, but the inner end of the trailing edge, that is the end adjacent the fuselage, being drawn downwardly to a position of maximum drag as at 29. As the inner end of the trailing edge draws down to point 29 the portion 12 is warped so that it is convex at its outer end, its normal shape at that point, and concave at the end adjacent the fuselage, the camber of part 6 increasing accordingly.

If the control spar 15 is swung in the opposite direction the several links are moved into the positions indicated in dotted lines at 18a, 19a, 20a, 21a, thereby swinging the inner end of trailing edge 5 upwardly through its normal position 23 to position 30 thereby reducing the camber of part 6 and changing practically the entire under surface of the airfoil from concave to convex.

By means of the construction described, a pilot may instantly alter the shape of the airfoils as desired to secure low take-off and landing speeds, and high lift, without decreasing the top speed.

The adjustments on the two airfoils of an aeroplane may be effected simultaneously and in the same direction to obtain a greater angle of climb or certain other desired results as above set forth, or they may be effected simultaneously in opposite directions to provide lateral control.

As one means of manipulating the control spars I provide a standard 31 revolubly mounted in the fuselage as indicated at 32 and provided with means for rotating the same a distance in either direction as at 33. A bellcrank 34 is mounted on the standard and connected to the two control spars 15—15a by links 35—35a. Rotation of standard 31 in either direction will move spars 15—15a unequally in opposite directions to secure the result hereinbefore set forth. To move the spars 15—15a equally and simultaneously in the same direction I provide a cam sleeve slidably engaging standard 31 as at 36 and mounted on a cam shaft 37 operated by a lever 38 and mounted in bearings 39.

By operating the lever 38 the standard 31 may be thrown forwardly or backwardly on its foot-bearing 32 causing equal and simultaneous movements of the two control spars 15—15a for the purpose hereinbefore set forth.

Relative rigidity of the main airfoil and body structure is maintained by means of this construction, the flexibility of certain portions of the airfoils being obtained without materially adding to the weight of the aeroplane and without any sacrifice of strength.

It is to be understood, of course, that while I have herein shown and described but one specific embodiment of the invention, changes in form, construction, and method of assembly and operation may be made within the scope of the appended claims.

I claim:

1. An airfoil having fixed entering edge and top portions and flexible trailing edge and bottom portions, and means for simultaneously flexing the trailing edge and bottom portions in opposite directions.

2. An airfoil having fixed entering edge and top portions and flexible trailing edge and bottom portions, and means for simultaneously flexing the trailing edge and bottom portions in opposite directions and in progressively lessening degree from the root of the airfoil to the tip.

3. An airfoil having a body portion and flexible trailing edge and bottom portions, and a plurality of sets of links pivotally connecting the body and bottom portions, each set comprising front and rear links inclined rearwardly from their pivotal mounting on the body and intermediate links inclined forwardly from their mounting on the body, and means for actuating the links to flex the trailing edge and flexible bottom portion.

4. An airfoil comprising a body portion and flexible trailing edge and bottom portions, pivotal supporting means inserted between the body and flexible portions, and means for actuating the pivotal means comprising a spar disposed longitudinally of the airfoil and pivotally mounted at the tip thereof and connected to the flexible bottom portion, and means for swinging the spar about its pivotal mounting.

5. An airfoil comprising a body portion and flexible trailing edge and bottom portions, pivotal supporting means inserted between the body and flexible portions, and means for actuating the pivotal supporting means comprising a spar disposed longitudinally of the airfoil and pivotally and slidably engaging the tip thereof and connected to the flexible bottom portion, and means for moving the spar about its mounting whereby to actuate the pivotal supporting means.

6. An airfoil having a body portion and flexible trailing edge and bottom portions, a plurality of sets of links pivotally connecting the body and bottom portions, each set comprising front and rear links inclined rearwardly from their pivotal mountings on the body and intermediate links inclined forwardly from their mounting on the body, a spar mounted on the flexible bottom portion and longitudinally thereof and pivotally mounted in the end of the airfoil to swing in the plane thereof, and means for swinging the spar in its pivotal mounting.

FRANCIS F. PARKER.